(12) United States Patent  
Uzuki (10) Patent No.: US 6,473,113 B1
(45) Date of Patent: Oct. 29, 2002

(54) SCANNING OPTICAL APPARATUS (75) Inventor: Kazuo Uzuki, Abiko (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/671,727

(22) Filed: Sep. 27, 2000

(30) Foreign Application Priority Data

Sep. 30, 1999 (JP) ............................................ 11-279000
Sep. 30, 1999 (JP) ............................................ 11-279001
Sep. 25, 2000 (JP) ........................................ 2000-290909

(51) Int. Cl.$^7$ ............................. B41J 27/00; B41J 15/14
(52) U.S. Cl. ........................................ 347/257; 347/242
(58) Field of Search ................................ 347/242, 257, 347/241, 256, 258, 244, 245; 359/819, 703, 818

(56) References Cited

U.S. PATENT DOCUMENTS 5,499,045 * 3/1996 Takeshita et al. ............ 347/257
5,600,495 * 2/1997 Sekikawa .................... 359/819

* cited by examiner

Primary Examiner—Hai Pham
(74) Attorney, Agent, or Firm—Fitzpatrick, Cella, Harper & Scinto (57) ABSTRACT A scanning optical apparatus includes a light emitting device for emitting a laser beam, a deflection device for deflecting the laser beam and a pair of imaging lenses for scanning a photosensitive member by the deflected laser beam. Each of the imaging lenses has an abutment reference plane so arranged that they are urged toward opposite directions to abut respectively on abutment reference sections formed inside an optical cabinet by an urging member disposed as bridging the imaging lenses.

15 Claims, 8 Drawing Sheets

SCANNING OPTICAL APPARATUS

BACKGROUND OF THE INVENTION

1. Field of the Invention

This invention relates to a scanning optical apparatus to be suitably used for a laser beam printer, a laser facsimile machine or the like.

2. Related Background Art

Figure 9:
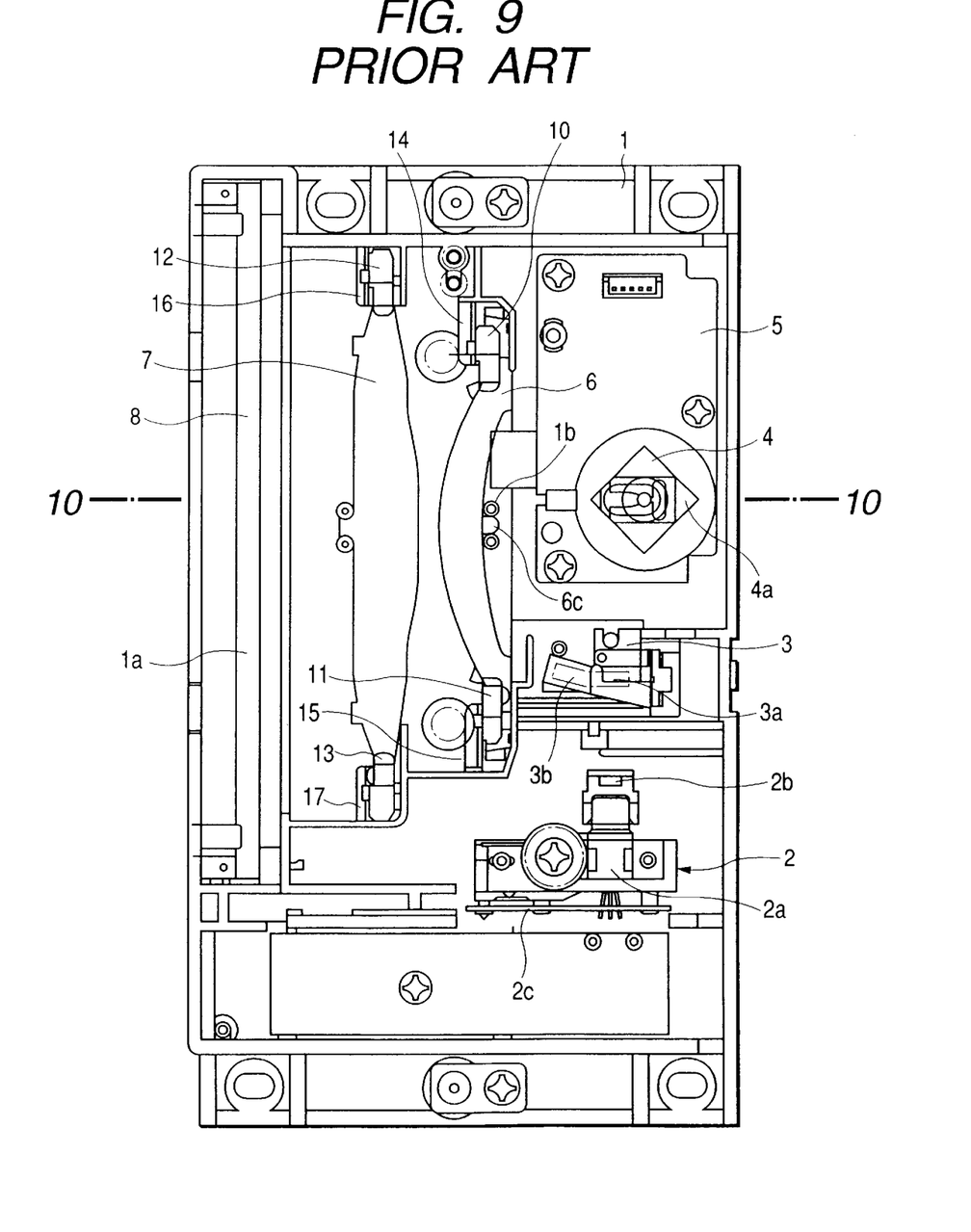
FIG. 9 is a schematic plan view of a known scanning optical apparatus.
Figure 10:
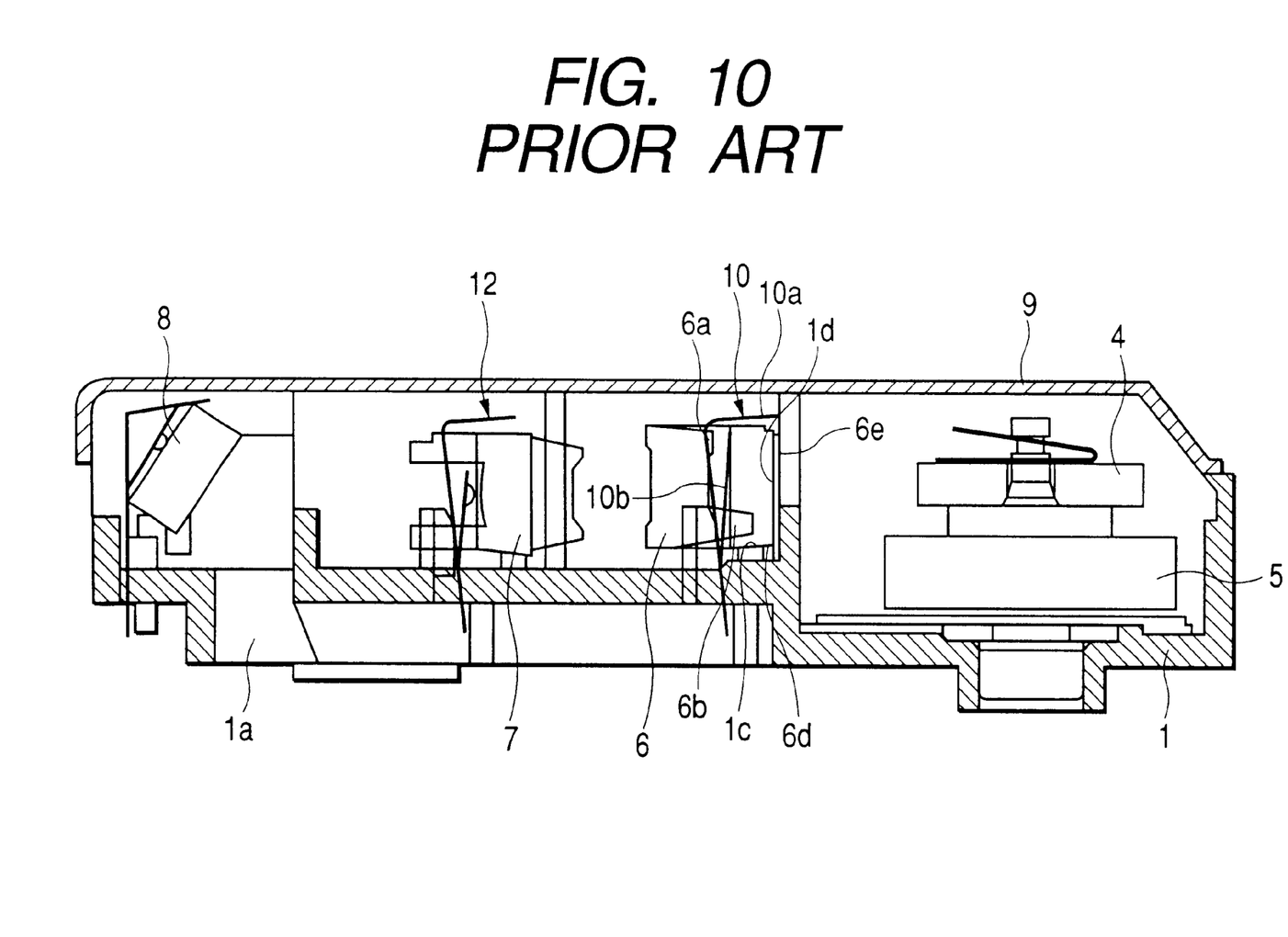
FIG. 10 is a schematic cross sectional view taken along line 10—10 in FIG. 9.

FIGS. 9 and 10 schematically illustrate a known scanning optical apparatus of the type under consideration. FIG. 9 is a schematic plan view of the apparatus, showing various parts arranged in an optical cabinet, and FIG. 10 is a schematic cross sectional view taken along line 10—10 in FIG. 9. As shown in FIGS 9 and 10, optical cabinet 1 contains therein a laser unit 2, a composite lens 3, a rotary polygon mirror 4, a drive motor 5, a first imaging lens 6, a second imaging lens 7 and a surface reflector (fold mirror) 8 along with other elements and the top opening of the optical cabinet 1 is covered by a lid 9. The laser unit 2 comprises a semiconductor laser beam source 2a, a collimator lens 2b, a photodetector section 2c and other components, while the composite lens 3 comprises a cylindrical lens 3a and a beam detecting lens 3b. The rotary polygon mirror 4 is provided with deflection/reflection planes 4a and driven to rotate by the drive motor 5.

As seen from FIGS. 9 and 10, the first imaging lens 6 is rigidly secured to the optical cabinet 1 by means of a pair of leaf springs 10, 11 and the second imaging lens 7 is rigidly secured to the optical cabinet 1 also by means of a pair of leaf springs 12, 13. The leaf springs 10 through 13 are arranged in respective spring securing sections 14, 15, 16, 17 of the optical cabinet located at the light exiting sides of the imaging lenses 6, 7 so that the latter are urged toward the light entering sides thereof.

The first imaging lens 6 is typically provided with;upper and lower flange sections 6a, 6b of which the lower flange section 6b have a projection 6c projecting from the longitudinal center thereof for the purpose of centering the first imaging lens 6. Additionally, the first imaging lens 6 is provided at the longitudinal opposite ends thereof with respective upright direction reference planes 6d, 6d that are arranged at the lower flange section 6b, while an optical axial direction reference plane 6e is arranged at the light entering side of the lens 6.

The optical cabinet 1 is provided with an opening 1a for allowing the laser beam reflected by the surface reflector 8 to pass therethrough, a pair of positioning pins 1b, 1b for pinching the projection 6c of the first imaging lens 6, an upright direction reference section 1c on which the upright direction reference planes 6d, 6d of the first imaging lens 6 abut, a rib-shaped optical axial direction reference section 1d on which the optical axial direction reference plane 6e of the first imaging lens 6 abuts and an anchor claw for anchoring the leaf springs 10.

The leaf spring 12 is made to show a profile that corresponds to that of the second imaging lens 7 and the leaf springs 11, 13 are arranged symmetrically relative to the corresponding leaf springs 10, 12. Additionally, the spring securing section 16 is made to show a profile that corresponds to that of the leaf spring 12 and the spring securing sections 15, 17 are arranged symmetrically relative to the corresponding spring securing sections 14, 16.

With the above described known optical scanning apparatus, a total of four leaf springs 10 through 13 having respective profiles that are different from each other are required in order to rigidly secure the imaging lenses 6, 7 to the optical cabinet 1. So many leaf springs may by turn require a large number of assembling and disassembling steps and cumbersome control procedures. Additionally, since the spring securing sections 14 through 17 are respectively subjected to the reactions of the urging forces of the leaf springs 10 through 13, large power is required when, fitting the leaf springs 10 through 13 to the optical cabinet 1.

SUMMARY OF THE INVENTION

In view of the above identified problems of the prior art, it is therefore the object of the present invention to provide an optical scanning apparatus that comprises a reduced number of components and whose imaging lenses can be mounted and dismounted with ease.

According to the invention, the above object is achieved by providing a scanning optical apparatus comprising a light emitting means adapted to emit a laser beam, a deflection means for deflecting the laser beam from said light emitting means and a pair of imaging lenses adapted to scan a photosensitive member by the laser beam from the deflection means, the abutment reference planes of the optical axial direction of said imaging lenses being arranged at the back sides of said imaging lenses relative to the oppositely disposed respective surfaces of the lenses.

In another aspect of the invention, there is provided a scanning optical apparatus comprising a light emitting means adapted to emit a laser beam, a deflection means for deflecting the laser beam from said light emitting means and a pair of imaging lenses adapted to scan a photosensitive member by the laser beam from the deflection means, the abutment reference planes of the optical axial direction of said imaging lenses being arranged at the oppositely disposed respective surfaces of the lenses.

In still another aspect of the invention, there is provided a scanning optical apparatus comprising a light emitting means adapted to emit a laser beam, a deflection means for deflecting the laser beam from said light emitting means, first and second imaging lenses adapted to scan a photosensitive member by the laser beam from the deflection means and an urging member for urging said first and second imaging lenses, said urging member being adapted to urge said second imaging lens in a direction opposite to the direction of urging said first imaging lens.

In a further aspect of the invention, there is provided a scanning optical apparatus comprising a light emitting means adapted to emit a laser beam, a deflection means for deflecting the laser beam from said light emitting means, first and second imaging lenses adapted to scan a photosensitive member by the laser beam from the deflection means and an urging member for urging said first and second imaging lenses, said urging member being adapted to urge one or more than one optical components in addition to urging said first and second imaging lenses.

DESCRIPTION OF THE PREFERRED EMBODIMENTS

First Embodiment

The first embodiment of the scanning optical apparatus according to the invention is characterized in that it comprises an urging member for urging both the first and second imaging lenses in respective directions that are opposite to each other.

Figure 1:
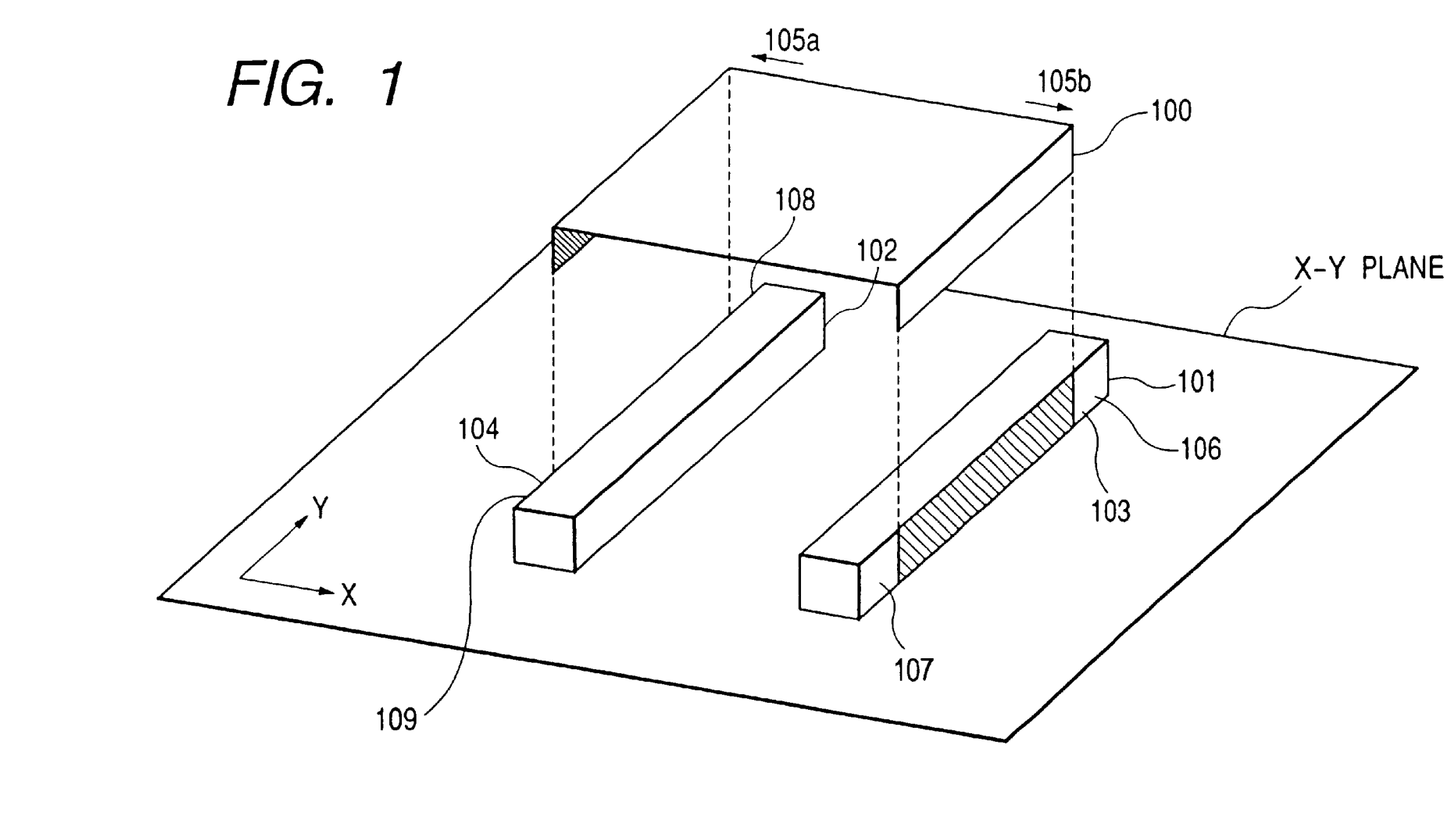
FIG. 1 is a schematic perspective partial view of the first embodiment of the invention, showing only the first and second imaging lenses and the urging member.

FIG. 1 is a schematic perspective partial view of the first embodiment of the invention, showing only the first and second imaging lenses and the urging member thereof.

Referring to FIG. 1, the first and second imaging lenses 101, 102 are arranged on XY plane and separated from each other by a given distance in the X-axis. For the purpose of convenience, the first and second imaging lenses 101, 102 are represented by so many rectangular parallelepipeds in FIG. 1.

The first imaging lens 101 has a surface 103, which surface 103 is located at the side of the first imaging lens 101 opposite to the side facing the second imaging lens 102. The first imaging lens 101 is an oblong lens that is extending in the Y-axis. The surface 103 of the first imaging lens 101 has opposite ends 106, 107 separated from each other in the Y-axis.

The second imaging lens 102 has a surface 104, which surface 104 is located at the side of the second imaging lens 102 opposite to the side facing the first imaging lens 101, although the surface 104 is not visible in FIG. 1. The second imaging lens 102 is an oblong lens that is extending in the Y-axis. The surface 104 of the second imaging lens 102 has opposite ends 108, 109 separated from each other in the Y-axis.

Referring to FIG. 1, there is also shown an urging member 100 having two bent parts. One of the two bent parts urges the first imaging lens 101 at the surface 103, whereas the other bent part urges the second imaging lens 102 at the surface 104.

Arrow 105a in FIG. 1 indicates the direction in which the surface 103 is urged. Note that the force urging the surface 103 in the direction 105a tries to separate the other bent part away from the surface 104. On the other hand, arrow 105b in FIG. 1 indicates the direction in which the surface 104 is urged. It will be appreciated that the force urging the surface 104 in the direction 105b tries to separate the first bent part away from the surface 103. The two urging forces 105a, 105b run along the X-axis and are oppositely directed.

Thus, if the urging member applies a large force to one of the imaging lenses to push it in the proper direction, no significant force is applied to the other imaging lens. As a result, the urging member is prevented from being warped except the related bent part.

Additionally, since the urging member urges the imaging lenses in opposite directions, the forces urging the imaging lenses offset each other.

In this embodiment, the urging member 100 is preferably a resilient leaf spring. Then, the bent parts operate as so many springs so that they urge the respective imaging lenses once they are fit in position. The leaf spring may be made of metal or resin.

In this embodiment, the urging member 100 may be so configured that it urges the first and second imaging lenses 101, 102 at the four ends 106, 107, 108, 109 thereof. This arrangement also requires the use of only a single urging member.

In this embodiment, the urging member 100 may alternatively be so configured that it urges the first and second imaging lenses 101, 102 at the two ends 106, 108 thereof. Then, another urging member (not shown) may be used to urge the first and second imaging lenses 101,102 at the remaining two ends 107, 109. This arrangement requires the use of two urging members.

In short, in this embodiment, only one or two urging members are used to urge the first and second imaging lenses.

If the urging member is a leaf spring, the operation of assembling the scanning optical apparatus is very simple because the leaf spring can be fit in position with a single manual action so that the entire assembling operation can be manually conducted. This means that the assembling operation does not require the use of one or more than one costly industrial robots. Additionally, since the assembling operation can be manually conducted, any change in the design of the profiles and the positions of the imaging lenses does not require a specific program for instructing the assembling robots to respond to the change. This means that the time required for the design change and the implementation of the change on the assembly line can be minimized.

Thus, the net effect of the present invention is a significant reduction in the cost of manufacturing a scanning optical apparatus.

When a scanning optical apparatus additionally comprises a fold mirror and/or a cylindrical lens, it may be so arranged that the urging member urges at least the fold mirror or the cylindrical lens in addition to the first and second imaging lenses. With such an arrangement, it is not necessary to provide an additional member for holding the fold mirror and/or the cylindrical lens. Then, the number of components of the scanning optical apparatus can be minimized to simplify the operation of assembling the apparatus and reduce the manufacturing cost. Additionally, if it is so arranged that the urging member for urging both the first and second imaging lenses also urges at least either the fold mirror or the cylindrical lens, at least either the fold mirror or the cylindrical lens can be placed close to at least either the first imaging lens or the second imaging lens to enhance the design freedom and consequently reduce the size of the scanning operation apparatus.

If the urging member is adapted to urge the fold mirror, it may have a large surface area, extending to the fold mirror.

If, on the other hand, the urging member is adapted to urge the cylindrical lens, it may be so arranged that the latter is urged by a pressure applying section produced by bending part of the urging member.

Alternatively, it may be so arranged that the urging member urges a composite lens comprising a cylindrical lens and a BD lens (beam detecting lens) as integral parts thereof.

If the urging member urges the composite lens, the beam detecting means can be arranged close to the imaging lenses to further reduce the size of the scanning optical apparatus.

Second Embodiment

Figure 2:
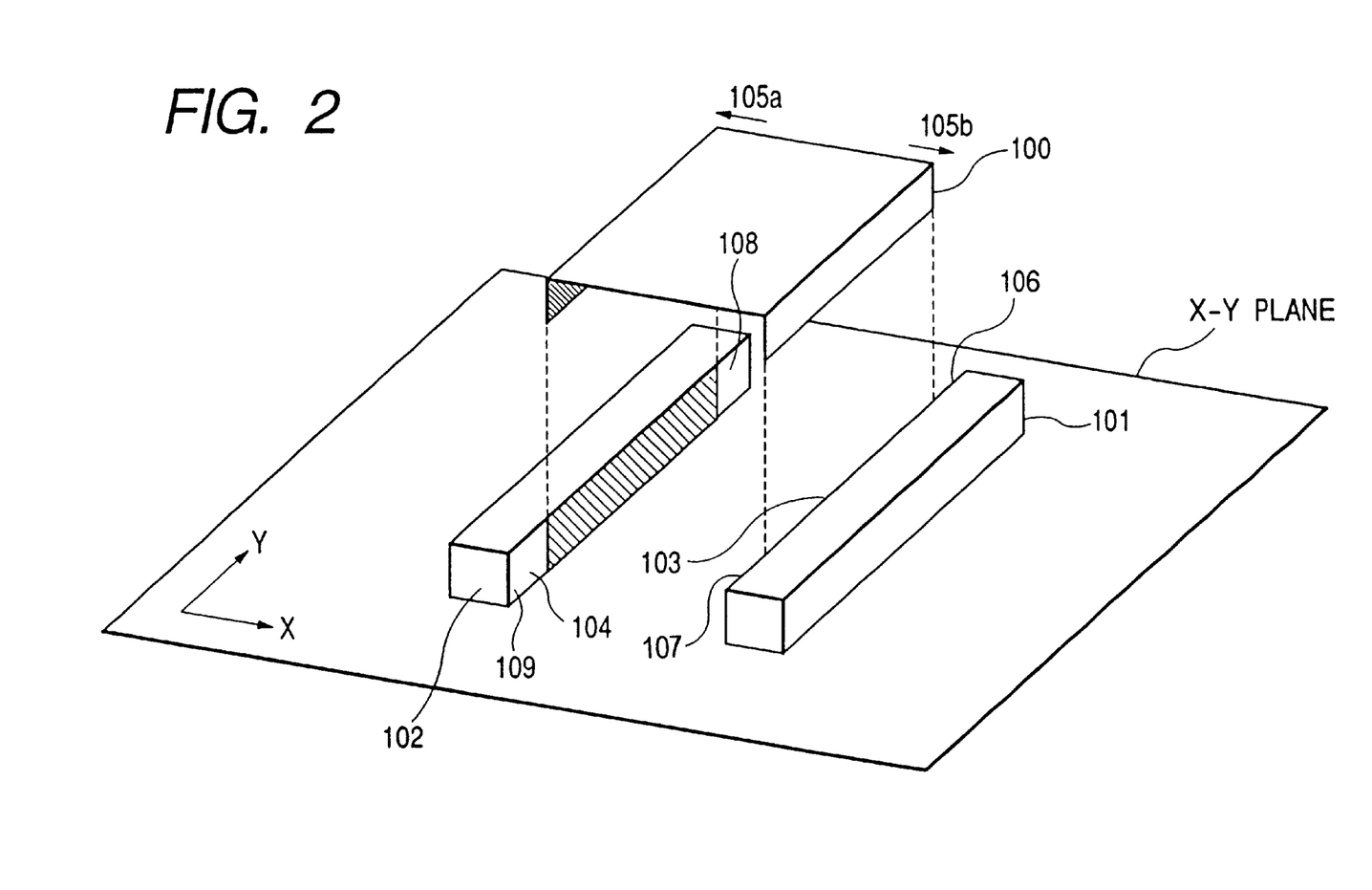
FIG. 2 is a schematic perspective partial view of the second embodiment of the invention, showing only the first and second imaging lenses and the urging member.

FIG. 2 is a schematic perspective partial view of the second embodiment of the invention, showing only the first and second imaging lenses and the urging member thereof.

Referring to FIG. 2, this embodiment differs from the first embodiment in that the urging member 100 urges the first and second imaging lenses 101, 102 at the surfaces 103, 104 that face each other. Otherwise, this embodiment is identical with the first embodiment.

Third Embodiment

The third embodiment of the present invention is characterized in that a pair of imaging lenses are rigidly secured to the optical cabinet and urged in the opposite directions along the central optical axis by a single securing (urging) member. The securing means and the two imaging lenses have a relationship that is the same as their counterparts of the second embodiment in that the securing member urges and secures the first and second imaging lenses at the surfaces of the latter that face each other.

Now, this embodiment will be discussed in greater detail.

More specifically, in the third embodiment, the single securing means secures the two imaging lenses to the optical cabinet and urges one of the imaging lenses toward the deflector side and the other imaging lens toward the opposite side, or the side of the fold mirror.

Figure 3:
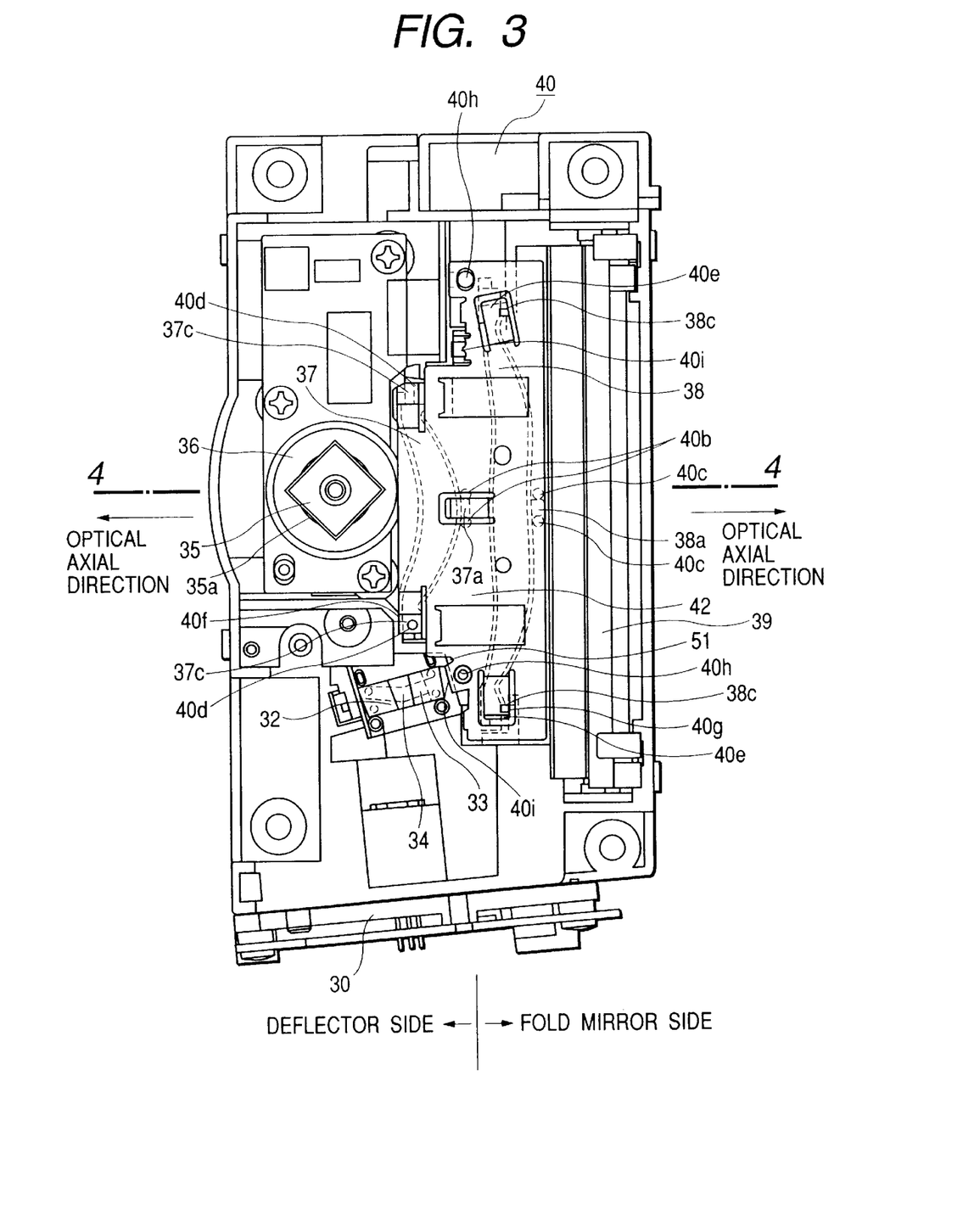
FIG. 3 is a schematic plan view of the third embodiment of scanning optical apparatus according to the invention.
Figure 4:
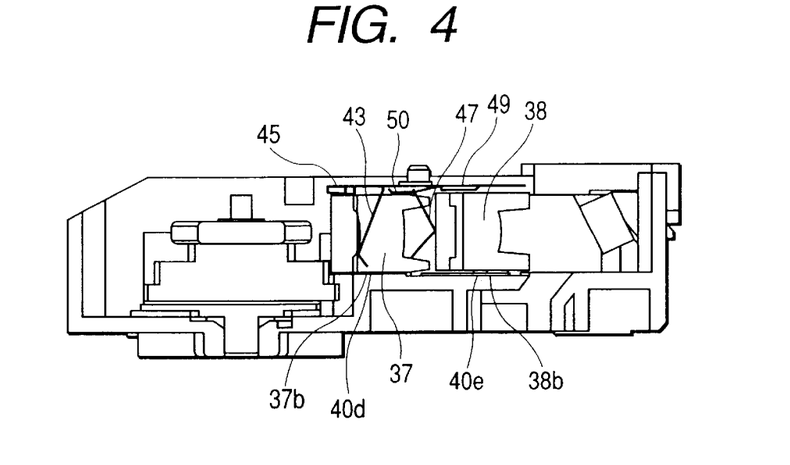
FIG. 4 is a schematic cross sectional view of the third embodiment taken along line 4—4 in FIG. 3.

FIG. 3 is a schematic plan view of the third embodiment of scanning optical apparatus according to the invention obtained by removing the lid (not shown). FIG. 4 is a schematic cross sectional view of the third embodiment taken along line 4—4 in FIG. 3, which line is identical with the optical axis of the imaging lenses. This embodiment of scanning optical apparatus comprises a laser holder 30 having in it a semiconductor laser beam source, a synchronism sensing light receiving section and a collimator lens for collimating the beam generated by the semiconductor laser, a composite lens 34 having as integral parts thereof a cylindrical lens 32 for converging the collimated beam from the collimator lens into a linear beam and a synchronism sensing lens (BD lens) 33, a rotary polygon mirror 35 having a deflection/reflection plane located near the linear image formed by the cylindrical lens 32 and operating as deflection means, a motor 36 for driving the rotary polygon mirror 35 to rotate, a first imaging lens 37, a second imaging lens 38 and a surface reflector (fold mirror) 39 for shifting the direction of the light beam to a photosensitive member along with other components contained in an optical cabinet 40. The optical cabinet 40 is hermetically sealed by a lid (not shown).

A leaf spring 42 is arranged on the first and second imaging lenses 37, 38. In FIG. 3, the first and second imaging lenses 37, 38 are indicated by dotted lines because they are hidden by the leaf spring 42.

The first and second imaging lenses 37, 38 are provided respectively with centering projections 37a, 38a, upright direction reference planes 37b, 38b and optical axial direction reference planes 37c, 38c. The optical axial direction reference planes 37c of the first imaging lens 37 and the optical axial direction reference planes 38c of the second imaging lens 38 are directed oppositely. Note that each of the imaging lenses is provided with a pair of optical axial direction reference planes 37c or 38c located at the opposite ends of the imaging lens relative to the central optical axis thereof.

The optical cabinet 40 is provided with a pair of positioning pins 40b, 40b for pinching the projection 37c of the first imaging lens 37, an upright direction reference section 40d on which the upright direction reference plane 37b of the first imaging lens 37 abuts, an optical axial direction reference section 40f on which the optical axial direction reference planes 37c of the first imaging lens 37 abut, another pair of positioning pins 40c, 40c for pinching the projection 38a of the second imaging lens 38, another upright direction reference section 40e on which the upright direction reference plane 38b of the second imaging lens 38 abuts, another optical axial direction reference section 40g on which the optical axial direction reference planes 38c of the second imaging lens 38 abut, positioning pins 40h for securing the leaf spring 42 and anchor projections 40i.

Figure 5:
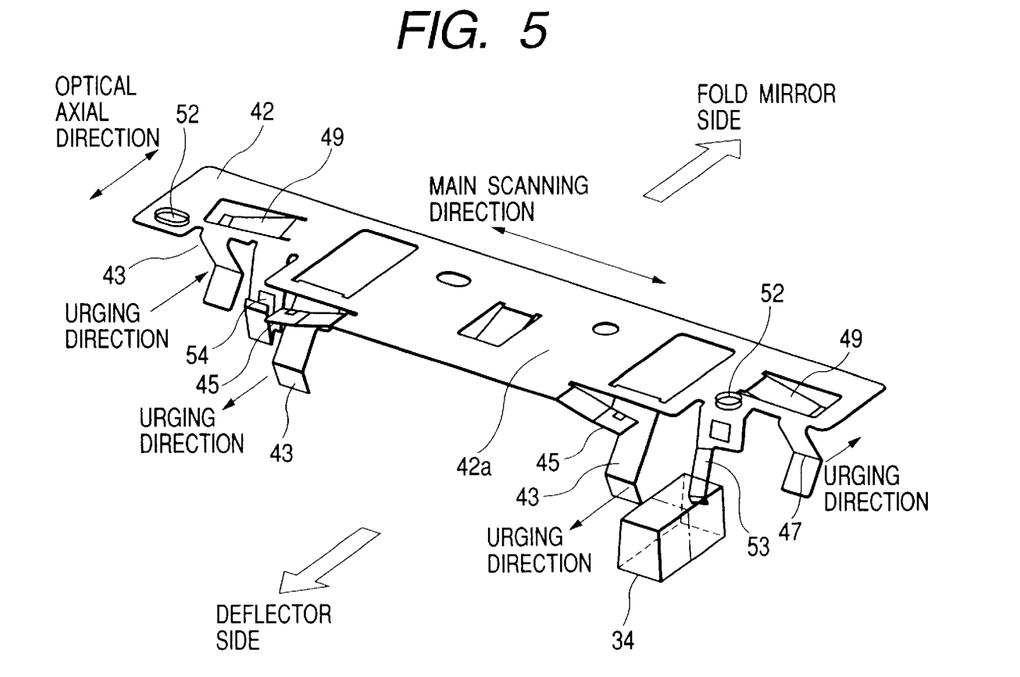
FIG. 5 is a schematic perspective view of the leaf spring, shown in FIGS. 3 and 4.

FIG. 5 is a schematic perspective view of the leaf spring shown in FIGS. 3 and 4. As shown in FIG. 5, the leaf spring 42 comprises a main body section 42a that is held substantially in parallel with the main-scanning direction, optical axial direction urging sections 43 and 47, each extending substantially perpendicularly downward from the main body section 42a and having a bent front end for urging the corresponding imaging lens in the direction of the optical axis, upright direction urging sections 45, 49, 50, each extending obliquely downward from the main body section 42a and having an end for urging the corresponding imaging lens in the upright direction, a lateral direction urging section 51 of the cylindrical lens 32, alignment holes 52 to be used when fitting the leaf spring 42 to the optical cabinet 40 and anchor members 53.

The urging sections 43 and 47 are produced by appropriately bending respective parts of the leaf spring that is secured to the optical cabient. In other words, the urging sections 43 and 47 are integral with the main body.

The urging section 43 urges the first imaging lens 37 that is located at the side of the deflector toward the latter along the optical axis.

The urging section 47 urges the second imaging lens 38 that is located at the side of the fold mirror toward the latter along the optical axis.

Thus, it will be appreciated that the deflector and the fold mirror are arranged oppositely along the optical axis relative to the two imaging lenses and the two imaging lenses are urged in the opposite directions along the optical axis by the respective urging sections 43 and 47.

The urging sections 43, 47 urges the two imaging lenses in opposite directions along the optical axis from between the two lenses.

Note that the single leaf spring urges each of the two imaging lenses at the opposite ends thereof. In other words, the leaf spring urges the two imaging lenses and secure them in position by means of four urging areas thereof.

When assembling, the lenses are arranged in position and subsequently the leaf spring 42 is secured to the optical cabinet 40 as it is put into its proper position from above so that the two positioning pins 40h arranged in an upper part of the optical cabinet 40 come into engagement with the corresponding respective positioning holes 52 and the anchor hole members 53 get to the corresponding respective anchor projections 40i.

At this stage, the optical axial direction reference planes 37c of the first imaging lens 37 are made to abut the optical axial direction reference section 40f on the optical cabinet 40 by the respective optical axial direction urging sections 43 arranged on the leaf spring 42. On the other hand, the upright direction reference plane 37b of the first imaging lens 37 is made to abut the upright direction reference sections 40d and secured to the optical cabinet 40 respectively by the upright direction urging sections 45, 50 arranged on the leaf spring 42.

Similarly, the optical axial direction reference planes 38c of the second imaging lens 38 are made to abut the optical axial direction reference section 40g on the optical cabinet 40 by the respective optical axial direction urging sections 47 arranged on the leaf spring 42. On the other hand, the upright direction reference plane 38b of the second imaging lens 38 is made to abut the upright direction reference sections 40e and secured to the optical cabinet 40 respectively by the upright direction urging sections 49 arranged on the leaf spring 42.

Thus, with this embodiment, since the optical axial direction urging sections 43 and the optical axial direction urging sections 47 urge the respective imaging lenses in opposite directions so that the generated reactive forces offset each other and no force is generated along the optical axis at the time of assembling and during the use of the scanning optical apparatus.

Therefore, with this embodiment, both the first and second imaging lenses can be secured in position by the leaf spring with a single operation. Additionally, the first and second imaging lenses that are secured in position can be removed from the optical cabinet of this embodiment simply by pulling out the leaf spring. While the first and second imaging lenses are not bonded to the optical cabinet of this embodiment, it may alternatively be so arranged that at least one of the imaging lenses is bonded and secured to the optical cabinet by means of photosetting type resin that can typically be set by UV rays and then the first and second imaging lenses are secured in position by the leaf spring.

Additionally, it may be so arranged that the cylindrical lens 32 and/or the composite lens 34 is urged in a direction perpendicular to the optical axis and preliminarily secured to the optical cabinet 40 by the lateral direction urging section 51.

While the cylindrical lens and/or the composite lens of this embodiment is urged in a direction perpendicular to the optical axis and preliminarily secured to the optical cabinet 40 in the above description, an upright direction urging section (not shown) may be added in order to permanently secure it to the optical cabinet.

With the above described arrangement, the light beam emitted from the semiconductor laser beam source of the laser holder 30 is collimated by the collimator lens and made to form a linear image on the deflection/reflection plane 35a of the rotary polygon mirror 35 by the cylindrical lens 32. The light beam deflected/reflected by the deflection/reflection plane 35a is then made to pass through the opening of the optical cabinet 40 by way of the first imaging lens 37, the second imaging lens 38 and the surface reflector 39 and to irradiate a photosensitive member (not shown) for scanning. A scanning operation is triggered when the light beam deflected/reflected by the deflection/reflection plane 35a gets to the synchronism sensing light receiving section on the laser holder 30 by way of the synchronism sensing lens 33.

The first imaging lens 37 and the second imaging lens 38 operate to converge the light beam reflected by the deflection/reflection plane 35a so as to make it form a spot on the photosensitive member. The apparatus is so designed that the spot on the photosensitive member scans the latter at a constant scanning speed. The light beam is made to scan the photosensitive member (not shown) in the main-scanning direction by the rotary motion of the polygon mirror 35 and also in the sub-scanning direction as the cylindrical photosensitive member is driven to rotate around its axis of rotation so that an electrostatic latent image is formed on the surface of the photosensitive member. Thus, an electrophotographic image forming apparatus such as a laser beam printer or a copying machine can be realized by combining a scanning optical apparatus according to the invention and a photosensitive member (not shown).

Since a plurality of optical components are secured by means of a single securing member in the above described embodiment of the scanning optical apparatus according to the invention, the embodiment can be assembled with a remarkably reduced number of steps and can be assembled in a highly efficient way. Additionally, as the two imaging lenses are urged along the optical axis in such a way that the generated reactive forces offset each other, no horizontal force is generated along the optical axis at the time of assembling so that the securing member can be mounted in an easy and effective way.

Fourth Embodiment

The fourth embodiment of the invention is characterized in that a single securing member that is a single leaf spring urges and secures the first imaging lens at an end thereof and the second imaging lens also at an end thereof located at the same side relative to the optical axis. Otherwise, this embodiment is identical with the second embodiment.

This embodiment will be described in detail by referring to FIGS. 6 through 8.

Figure 6:
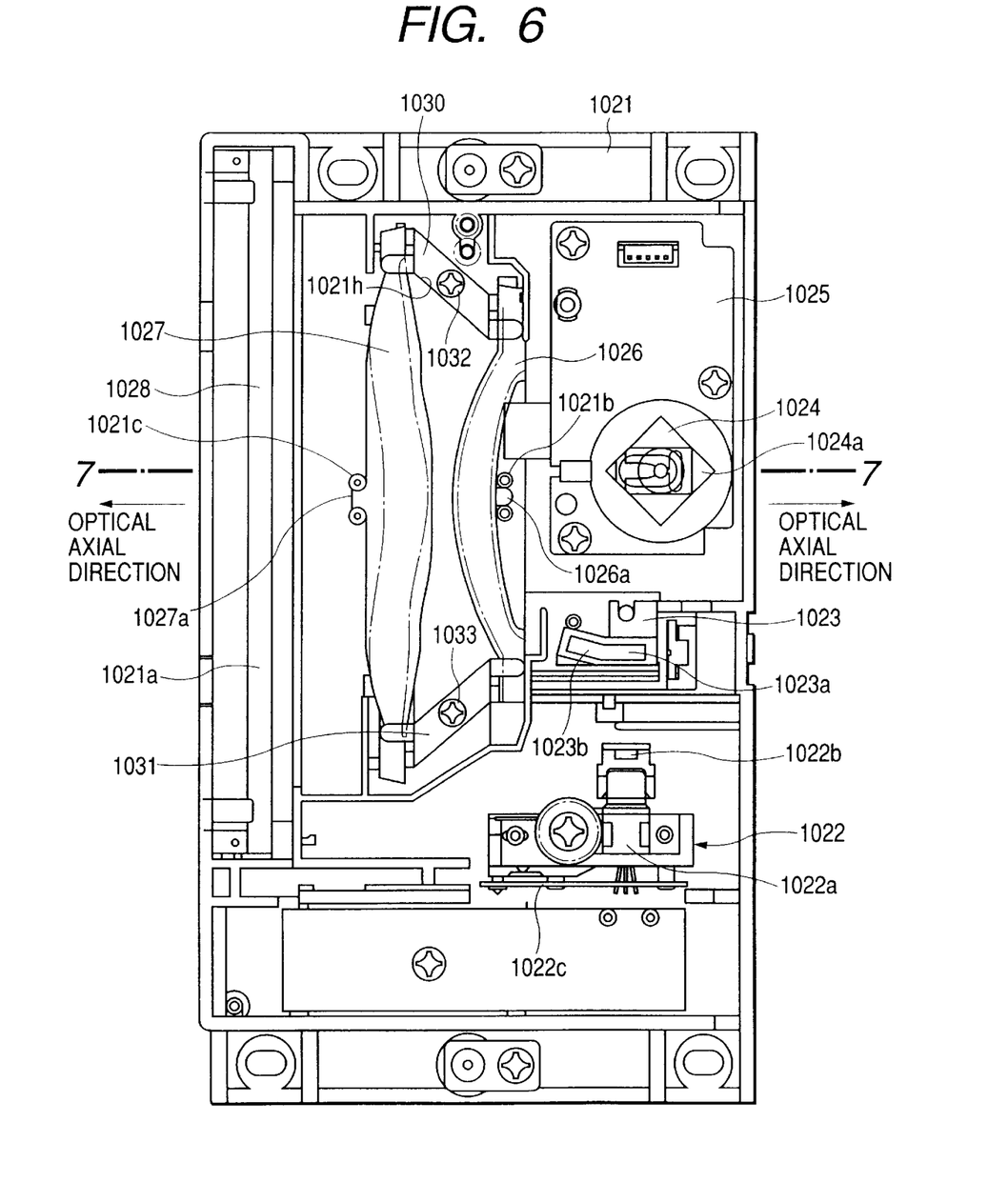
FIG. 6 is a schematic plan view of the fourth embodiment of scanning optical apparatus according to the invention.
Figure 7:
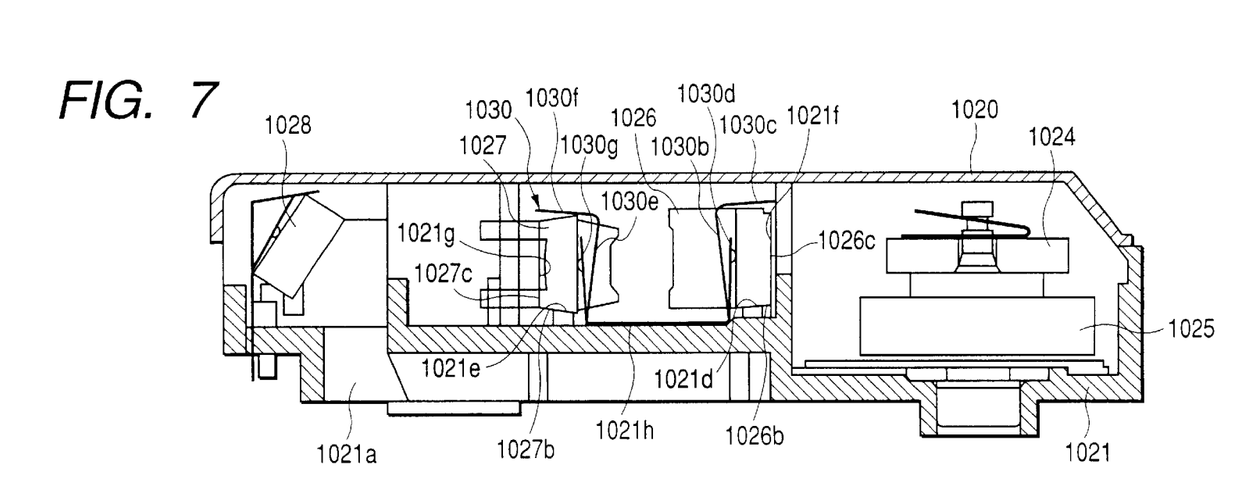
FIG. 7 is a schematic cross sectional view of the fourth embodiment taken along line 7—7 in FIG. 6.

FIG. 6 is a schematic plan view of the fourth embodiment of scanning optical apparatus according to the invention obtained by removing the lid (not shown) and FIG. 7 is a schematic cross sectional view of the fourth embodiment taken along line 7—7 in FIG. 6, to which the lid 1020 is fitted. This embodiment comprises a laser unit 1022, a composite lens 1023, a rotary polygon mirror 1024, a drive motor 1025, a first imaging lens 1026, a second imaging lens 1027 and a surface reflector 1028 contained in an optical cabinet 1021. The laser unit 1022 includes a semiconductor laser beam source 1022a, a collimator lens 1022b, a photodetector 1022c and other elements. The composite lens 1023 comprises a cylindrical lens 1023a and a beam detecting lens 1023b and the rotary polygon mirror 1024 is provided with deflection/reflection planes 1024a. The rotary polygon mirror 1024 is supported by the drive motor 1025.

With the above described arrangement, the laser beam emitted from the semiconductor laser beam source 1022a is collimated by the collimator lens 1022b and made to form a linear image near the deflection/reflection plane 1024a of the rotary polygon mirror 1024 as it passes through the cylindrical lens 1023a. The laser beam deflected/reflected by the deflection/reflection plane 1024a is mostly transmitted through the first imaging lens 1026 and the second imaging lens 1027, reflected by the surface reflector 1028 and then made to pass through the opening 1021a of the optical cabinet 1021 before striking a photosensitive member (not shown) for scanning. A writing operation is triggered when part of the laser beam deflected/reflected by the deflection/reflection plane 1024a gets to the light detecting section 1022c by way of the light detecting lens 1023b.

The laser beam transmitted through the first and second imaging lenses 1026, 1027 is converged to form a spot of light on the photosensitive member and scan the surface of the photosensitive member at a constant speed. At the same time, the photosensitive member is driven to rotate in a predetermined sense by a rotary drive means (not shown). As a result, the laser beam is made to scan the photosensitive member (not shown) in the main-scanning direction by the rotary motion of the polygon mirror 1024 and also in the sub-scanning direction as the cylindrical photosensitive member is driven to rotate around its axis of rotation so that an electrostatic latent image is formed on the surface of the photosensitive member. The electrostatic latent image is then visualized into a toner image by a developing unit (not shown) and the toner image is transferred onto a sheet of recording paper. Subsequently, the toner is heated and fixed by a fixing unit to produce a printed image.

The first and second imaging lenses 1026, 1027 are urged in respective directions by a pair of leaf springs 1030, 1031, which are arranged at the opposite ends of the imaging lenses relative to the optical axis thereof, so that the leaf springs 1030, 1031 urge the imaging lenses away from each other. The leaf springs 1030, 1031 are rigidly secured to the optical cabinet 1021 by means of screws 1032, 1033. The imaging lenses 1026, 1027 and the leaf springs 1030, 1031 are arranged symmetrically relative to the optical axis of the lenses. Therefore, this embodiment will be described hereinafter only in terms of one of the opposite ends of the imaging lenses 1026, 1027 and the corresponding one of the leaf springs, or the leaf spring 1030.

The imaging lenses 1026, 1027 are provided respectively with centering projections 1026a, 1027a, upright direction reference planes 1026b, 1027b and optical axial direction reference planes 1026c, 1027c. On the other hand, the optical cabinet 1021 is provided with an opening 1021a for allowing the laser beam reflected by the surface reflector 1028, two pairs of positioning pins 1021b, 1021c for respectively pinching the projections 1026a, 1027a of the imaging lenses 1026, 1027, upright direction reference sections 1021d, 1021e to which the upright direction reference planes 1026b, 1027b of the imaging lenses 1026, 1027 are respectively made to abut, optical axial direction reference sections 1021f, 1021g to which the optical axial direction reference planes 1026c, 1027c of the imaging lenses 1026, 1027 are respectively made to abut and a groove 1021h into which the leaf spring 1030 is fitted.

The leaf spring 1030 has a main body section 1030a to be rigidly secured in the groove 1021h of the optical cabinet 1021 by means of a screw 1032. The leaf spring 105 also has a first upright direction urging section 1030c extending substantially horizontally and formed by upwardly bending the front end of the main body section 1030a to form a support section 1030b and then bending the support section 1030b in a substantially horizontal direction to urge the upright direction reference plane 1026b of the first imaging lens 1026 against the upright direction reference section 1021d of the optical cabinet 1021. A first optical axial direction urging section 1030d is formed by obliquely upwardly bending the front end of the main body section 1030a to urge the optical axial direction reference plane 1026c of the first imaging lens 1026 against the optical axial direction reference section 1021f of the optical cabinet 1021. A second upright direction urging section 1030f extending substantially horizontally is formed by upwardly bending the rear end of the main body section 1030a to form a support section 1030e and by then bending the support section 1030e in a substantially horizontal direction to urge the upright direction reference plane 1027b of the second imaging lens 1027 against the upright direction reference section 1021e of the optical cabinet 1021. Finally a second optical axial direction urging section 1030g is formed by obliquely upwardly bending the rear end of the main body section 1030a to urge the optical axial direction reference plane 1027c of the first imaging lens 1027 against the optical axial direction reference section 1021g of the optical cabinet 1021. Thus, the leaf spring 1030 urges the first and second imaging lenses 1026, 1027 in opposite directions at the surfaces of the imaging lenses that face each other.

When mounting the imaging lenses 1026, 1027 onto the optical cabinet 1021, they are arranged at respective positions in the optical cabinet 1021 and then the main body section 1030a of one of the leaf springs, or the leaf spring 1030, is inserted into the corresponding one of the grooves of the optical cabinet 1021, or groove 1021h. The leaf spring 1030 is rigidly secured to the optical cabinet 1021 by means of the screw 1032. At this stage, the first and second upright direction urging sections 1030c, 1030f of the leaf spring 1030 are made to respectively urge the imaging lenses 1026, 1027 against the first and second upright direction reference sections 1021d, 1021e of the optical cabinet 1021. At the same time, the first and second optical axial direction urging sections 1030d, 1030g of the leaf spring 1030 are made to respectively urge the imaging lenses 1026, 1027 against the first and second optical axial direction reference sections 1021f, 1021g of the optical cabinet 1021. Thus, the imaging lenses 1026, 1027 exert respective reactive forces onto the opposite ends of the main body section 1030a of the leaf spring 1030 by way of the respective optical axial direction urging sections 1030d, 1030g. However, since it is so designed that the reactive forces applied to the opposite ends of the main body section 1030a offset each other, the leaf spring 1030 does not exert any force to the optical cabinet 1021.

The other leaf spring 1031 is also rigidly secured to the optical cabinet 1021 by means of the screw 1033. It will be appreciated that the other leaf spring 1031 operates exactly same as the leaf spring 1030.

As described above, the first and second imaging lenses 1026, 1027 of this embodiment are rigidly secured to the optical cabinet 1021 by means of a pair of leaf springs 1030, 1031 so that the number of parts of the scanning optical apparatus is reduced considerably if compared with any comparable apparatus. As a result, the number of steps of the operation of assembling the apparatus is also reduced to facilitate the control of the parts. Additionally, since the reactive forces of the first and second imaging lenses 1026, 1027 offset each other inside the leaf springs 1030, 1031, the latter would not act on the optical cabinet 1021 to consequently facilitate the operation of fitting them in position.

While the leaf springs 1030, 1031 of this embodiment are rigidly secured to the optical cabinet by means of screws 1032, 1033 in the above description, they may alternatively be anchored in position by means of resilient anchor claws.

Figure 8:
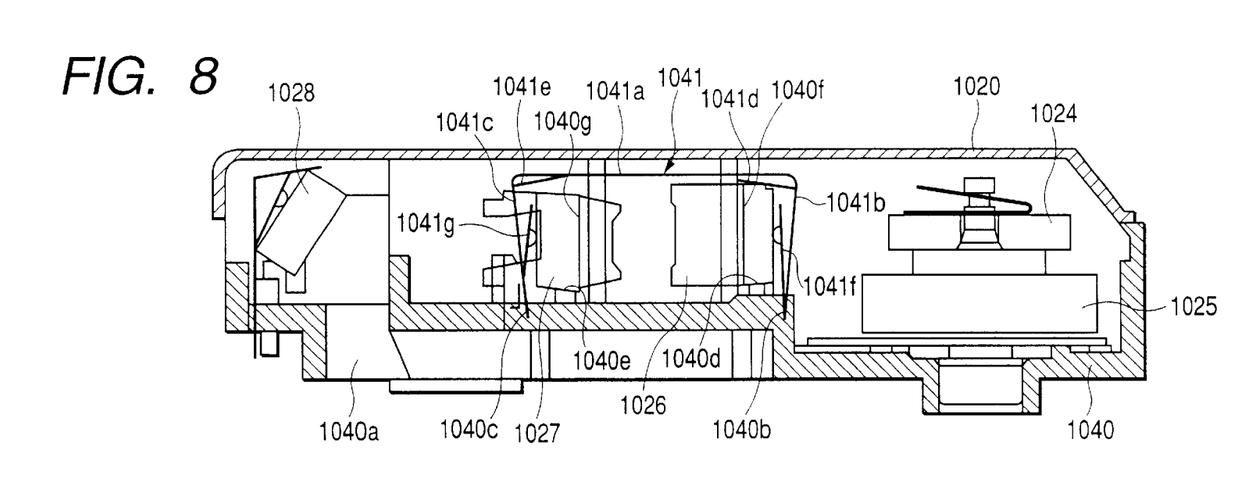
FIG. 8 is a schematic cross sectional view of an embodiment of the present invention obtained by modifying the fourth embodiment.

FIG. 8 is a schematic cross sectional view of an embodiment of the present invention obtained by modifying the above described fourth embodiment. In this embodiment, the optical cabinet 1040 has a configuration that slightly differs from the optical cabinet of the fourth embodiment. More specifically, the first and second imaging lenses 1026, 1027 are urged to come closer to each other by a pair of leaf springs 1041, 1042 (of which the leaf spring 1042 is not shown) arranged at the opposite sides relative to the optical axis of the imaging lenses. The optical cabinet 1040 is provided with an opening 1040a, positioning pins (not shown), first and second grooves 1040b, 1040c, first and second upright direction reference sections 1040d, 1040e and first and second optical axial direction reference sections 1040f, 1040g.

On the other hand, the leaf spring 1041 has a main body section 1041a to be arranged between the imaging lenses 1026, 1027, a pair of support sections 1041b, 1041c formed respectively by downwardly bending the front and rear ends of the main body section 1041a and inserted into the respective grooves 1040b, 1040c of the optical cabinet 1040, first and second upright direction urging sections 1041d, 1041e formed respectively by inwardly bending the upper parts of the support sections 1041b, 1041c to respectively urge the imaging lenses 1026, 1027 against the upright direction reference sections 1040d, 1040e of the optical cabinet 1040 and first and second optical axial direction urging sections 1041f, 1041g formed respectively by obliquely bending end parts of the support sections 1041b, 1041c to respectively urge the imaging lenses 1026, 1027 against the optical axial direction reference sections 1040f, 1040g of the optical cabinet 1040. The effect of this modified embodiment is similar to that of the above described fourth embodiment.

Since the optical axial abutment reference planes of the imaging lenses of the above embodiment of the optical scanning apparatus are arranged at the rear sides of the imaging lenses. relative to the surfaces that face each other, the abutment reference plane of each of the imaging lenses is urged against the corresponding abutment reference section of the optical cabinet by means of common urging members arranged between the two imaging lenses. Thus, again, the number of parts of the scanning optical apparatus can be significantly reduced if compared with any comparable apparatus. As a result, the number of steps of the operation of assembling the apparatus is also reduced to facilitate the control of the urging members.

Additionally, since the reactive forces of the first and second imaging lenses offset each other inside the common urging members, the latter would not act on the optical cabinet to consequently facilitate the operation of fitting the imaging lenses in position and removing them from the optical cabinet.

What is claimed is:

1. A scanning optical apparatus comprising:
a light emitting means adapted to emit a laser beam;
a deflection means for deflecting the laser beam from said light emitting means;
first and second imaging lenses adapted to pass light to a photosensitive member from the laser beam by way of the deflection means, wherein each of said first and second imaging lenses comprises a biasing side, and wherein the biasing sides of said first and second imaging lenses are sides facing away from each other;
an abutment reference portion, arranged in the optical axial direction, on each of said first and second imaging lenses, said abutment reference portion being arranged at the biasing side of each of said first and second imaging lenses; and
a resilient member urging both of said first and second imaging lenses at respective abutment reference portions.

2. A scanning optical apparatus according to claim 1, wherein said first and second imaging lenses are urged simultaneously by said resilient member arranged between them.

3. A scanning optical apparatus according to claim 2, wherein said resilient member comprises a pair of leaf springs arranged at opposite sides relative to the optical axis of said first and second imaging lenses.

4. A scanning optical apparatus comprising:
a light emitting means adapted to emit a laser beam;
a deflection means for deflecting the laser beam from said light emitting means;
first and second imaging lenses adapted to pass light to a photosensitive member from the laser beam by way of the deflection means, wherein each of said first and second imaging lenses comprises a biasing side, and wherein the biasing sides of said first and second imaging lenses face each other;
an abutment reference portion, arranged in the optical axial direction, on each of said first and second imaging lenses, said abutment reference portion being arranged at the biasing side of each of said first and second imaging lenses; and
a resilient member urging both of said first and second imaging lenses at respective abutment reference portions.

5. A scanning optical apparatus according to claim 4, wherein said first and second imaging lenses are urged simultaneously by said resilient member arranged between them.

6. A scanning optical apparatus according to claim 5, wherein said resilient member comprises a pair of leaf springs arranged at opposite sides relative to the optical axis of said first and second imaging lenses.

7. A scanning optical apparatus comprising:
a light emitting means adapted to emit a laser beam;
a deflection means for deflecting the laser beam from said light emitting means;
first and second imaging lenses adapted to pass light to a photosensitive member from the laser beam by way of the deflection means; and
an urging member for urging both of said first and second imaging lenses, said urging member being adapted to urge said second imaging lens in a direction opposite to the direction of urging of said first imaging lens.

8. A scanning optical apparatus according to claim 7, further comprising an additional urging member.

9. A scanning optical apparatus according to claim 7, wherein said urging member is adapted to also urge a cylindrical lens.

10. A scanning optical apparatus according to claim 7, wherein said urging member is adapted to urge each of said first and second imaging lenses at two positions.

11. A scanning optical apparatus according to claim 7, wherein said urging member is adapted to also urge a fold mirror.

12. A scanning optical apparatus comprising a light emitting means adapted to emit a laser beam, a deflection means for deflecting the laser beam from said light emitting means, first and second imaging lenses adapted to pass light to a photosensitive member from the laser beam by way of the deflection means, and an urging member for urging said first and second imaging lenses, said urging member being adapted to urge one or more than one optical component in addition to urging said first and second imaging lenses.

13. A scanning optical apparatus according to claim 12, wherein said additional optical component is a fold mirror.

14. A scanning optical apparatus according to claim 12, wherein said additional optical component is a cylindrical lens.

15. A scanning optical apparatus according to claim 12, wherein said additional optical component is a composite lens formed by combining a cylindrical lens and a beam detection lens.

* * * * *

UNITED STATES PATENT AND TRADEMARK OFFICE
CERTIFICATE OF CORRECTION

PATENT NO.     : 6,473,113 B1
DATED          : October 29, 2002
INVENTOR(S)    : Kazuo Uzuki It is certified that error appears in the above-identified patent and that said Letters Patent is hereby corrected as shown below:

Column 1,
Line 37, "with;upper" should read -- with upper --.

Column 2,
Line 8, "when," should read -- when --.

Column 6,
Line 39, "cabient." should read -- cabinet. --; and
Line 58, "secure" should read -- secures --.

Column 10,
Line 39, "exactly" should read -- exactly the --.

Column 11,
Line 28, "lenses." should read -- lenses --.

Signed and Sealed this

Eighteenth Day of November, 2003

JAMES E. ROGAN
*Director of the United States Patent and Trademark Office*